May 12, 1931. W. J. RITZEL 1,805,418
ELONGATED TABLET PACKAGE AND WRAPPING
Filed Aug. 26, 1929 2 Sheets-Sheet 1
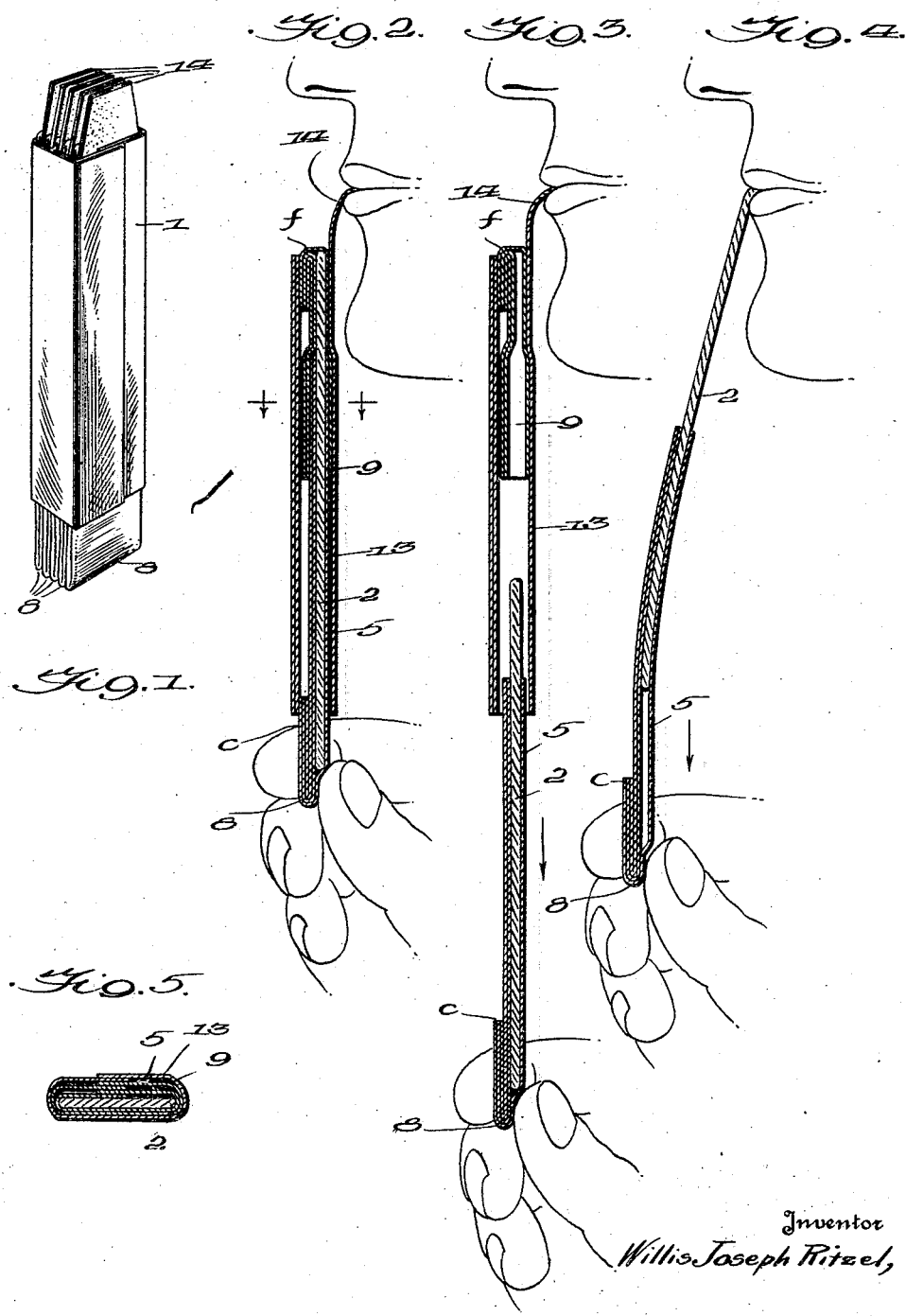

May 12, 1931. W. J. RITZEL 1,805,418
ELONGATED TABLET PACKAGE AND WRAPPING
Filed Aug. 26, 1929 2 Sheets-Sheet 2
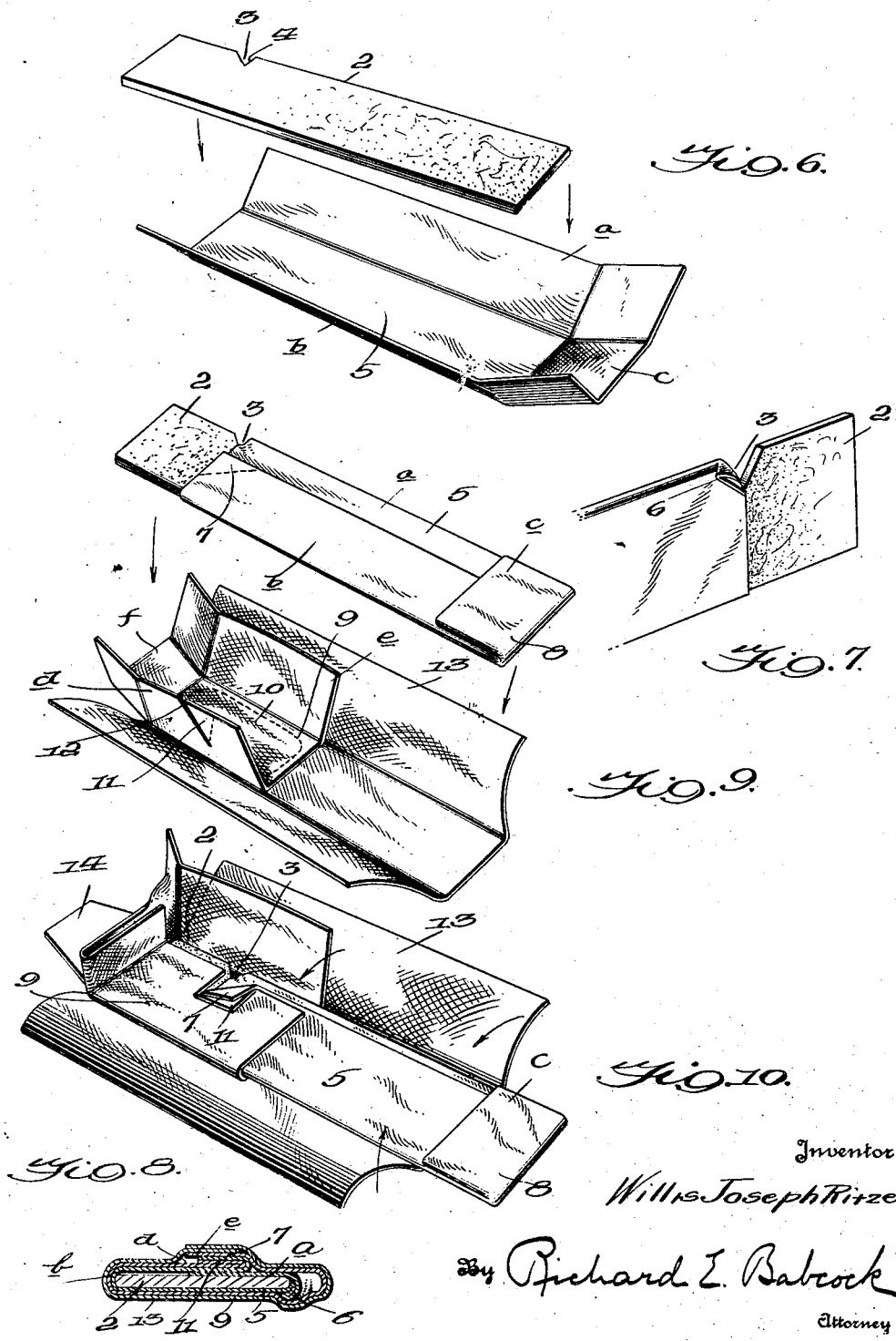
Inventor
Willis Joseph Ritzel,
By Richard E. Babcock
Attorney Patented May 12, 1931

1,805,418

UNITED STATES PATENT OFFICE

WILLIS JOSEPH RITZEL, OF PASADENA, CALIFORNIA

ELONGATED TABLET PACKAGE AND WRAPPING

Application filed August 26, 1929. Serial No. 388,365.

This invention relates to packages or special wrapping means for sticks of chewing gum and like relatively thin, long, narrow tablet or sheet form articles which are practically universally now sold commercially in packages of a number of individual wrapped units held together by a common wrapper or long tubular form band.

My invention is particularly intended for use by persons when driving automobiles, boats, airplanes or otherwise engaged in some activity requiring the use of at least one hand in operating or steering some mechanism.

Due to the fact that chewing gum especially is very carefully wrapped to seal the individual units to protect them against normal atmospheric conditions until such time as they may be consumed or used up, it is quite difficult for any one to strip off such wrappings and place the gum in his mouth without using both hands; so much so that, where there is no one to do it for them, most motorists either do without the satisfaction of their desire for a chew of gum while driving or else bring their cars to a stop so that they can safely have the free use of both hands in stripping the wrappings from the desired gum.

The primary objects of my present invention are: to provide a special wrapping means or package whereby the wrappings may be partially stripped from the individual units of gum so that the latter may be easily gripped between the lips or teeth and the stripping operation thereafter completed, and this simply with the use of one hand and the lips or teeth and without involving the annoyance of having to stop or the risk of even momentarily leaving the car to steer itself while the motorist uses both hands to strip the gum; to provide a perfectly sanitary package such that the contained chewing gum may be introduced directly into the consumer's mouth without need for, or risk of, the actual gum, as distinguished from its covering, being touched by the consumer's hands, or clothing or any foreign object, whereby said gum is completely protected against contamination with, or exposure to, germs or serving as a germ carrier; to provide in such a package a wrapping comprising a plurality of elements so combined that as partially stripped the exposed portion of the gum will be that portion of the gum nearest the consumer's mouth; to provide a special form of tablet or stick of gum and a special form of inner sealing wrapper portion whereby said gum and said wrapper portion or section will mechanically combine and interlock to prevent accidental or unintentional separation; to provide a special sectional overlapping interlocking inner sealing wrapper or wrapping in combination with an outer wrapper and means securing one of said sections of said inner wrapper and said outer wrapper together against independent endwise movement; to provide such a wrapping or individual unit package wherein each unit will be sealed against action by the atmosphere until used; to provide a special individual unit package of which a plurality may be held together in a single large commercial package, or which may be sold independently as desired; to provide a package comprising an all paper wrapping; and to provide a wrapping particularly lending itself to manufacture and application to the goods by automatic cutting, wrapping, folding, and gluing machinery of the type such as is now in extensive use for wrapping and packaging goods of this general character.

While the field of use particularly in view is in connection with relatively long, narrow, thin tablets, sticks or sheets of chewing gum such as now extensively sold in this country, the invention is not limited to use with chewing gum, but may be applied to any similarly shaped articles where desired.

In this application I show and describe only the preferred embodiment of my invention simply by way of illustration of the practice thereof, as by law required. However, it is obvious that my invention is capable of a number of other and different embodiments and that the various details thereof may be modified in a number of different ways, all without departing from my said invention and, therefore, the drawings and description herein are to be considered as merely illustrative and not as exclusive.

In the accompanying drawings:

Figure 1 represents a perspective view of a commercial package of a number of units embodying my invention;

Figure 2, a central longitudinal section through one of said units on a greatly enlarged scale, gripped preparatory to initial partial stripping;

Figure 3, a view similar to Fig. 2 and in intermediate stage of partial stripping;

Figure 4, a view similar to Fig. 3, after the partial stripping has been completed, and gripped preparatory to completion of the stripping and the insertion of the gum in the consumer's mouth;

Figure 5, a section on line 5—5 of Fig. 2, looking in the direction of the arrows;

Figure 6, a perspective superposed view of the gum 2 and the lower section 5 of the inner sealing wrapper in process of association;

Figure 7, a fragmentary perspective view of the upper end portion of the stick of gum 2 with section 5 applied thereto;

Figure 8, a transverse sectional view through one of the finished units taken on a slanting line intersecting the interlocking ears 7 and 11 and the reversely folded and crimped portion 6, the thickness of the various layers of, and the curves of, the various wrappings being greatly exaggerated;

Figure 9, a perspective view of the outer wrapping 12 with the upper inner sealing wrapping section 9 pasted thereto with the gum 2 having the section 5 applied thereto shown in superposed relation in the course of association of the various parts; and Figure 10, a perspective view of the various parts with the interlocking ears 7 and 11 of the inner wrapper or wrapping sections in interlocked relation, the arrows indicating the direction of folding of the various parts in the final steps of the wrapping process.

Referring now in detail to the drawings, the commercial package as sold over the counter comprises a plurality of individual units, five being illustrated in Fig. 1, held together by a common outer wrapper or binder 1 having its longitudinal edge portions overlapping and pasted together after said wrapper 1 has been drawn tightly about the said plurality of individual units.

Each individual unit consists of a stick of gum 2, an individual lower inner sealing paper wrapper section 5, an individual upper inner sealing paper wrapper section 9, and an individual outer preferably paper wrapper 13, the medial portion of the outer face of the upper inner sealing wrapper section 9 being secured to the opposed inner face portion of the outer individual wrapper 13 preferably over an extensive area as at 10, as indicated by dotted lines in Fig. 9, and preferably by a suitable adhesive.

The stick of gum 2 or tablet is preferably notched out as at 3 or otherwise formed to provide an abrupt shoulder 4 preferably extending at right angles to the adjacent side edge portion of the stick or tablet 2, or if desired the outer portion of said shoulder 4 may be slightly nearer the adjacent end of the tablet or stick of gum 2 than the inner portion of said shoulder 4, whereby the outer portion thereof would overhang or overlie the inner portion thereof, the object being to provide an abrupt protrusion or hook or shoulder, such as 4, to insure a positive mechanical engagement between the tablet 2 and the lower inner sealing wrapper section 5, and so long as a protrusion, hook, shoulder or face such as 4 in function be provided to be engaged by the lower inner sealing wrapper section 5 and to establish a mechanical interlocking relation between such parts which will resist accidental or unintentional separation thereof under normal conditions of transportation, merchandising and ordinary disposition and handling by the consumer, that will be sufficient so far as this feature of my invention is concerned, though notching out as at 3 permits the forming of the shoulder 4 within the general outline of the tablet or stick of gum 2, thus avoiding protrusions beyond the general contour of the tablet or stick of gum 2 and avoiding irregularity in shape that might present difficulties in the wrapping and packing operations. Of course, also, even though a less abrupt angle, or junction between the shoulder 4 and the adjacent side edge than the right angle shown might suffice, it is preferable, if this feature of interlock between the tablet or stick of gum 2 and lower inner sealing wrapper section 5 is to be taken advantage of, to make the mechanical interlock between them as positive as practicable to guard against accidental or unintentional separation and to positively insure the withdrawal of the tablet or stick of gum 2 with the lower inner sealing wrapper section 5 from the individual outer wrapper 13 and the upper inner sealing wrapper section 9 when desired.

The stick of gum 2 is arranged on the medial longitudinal portion of the lower inner sealing wrapper section 5 which then has its longitudinal side portions $a$ and $b$ folded flat, and in the order stated, against or toward the tablet 2 into overlapping relation, and its end portion $c$, as thus longitudinally folded, folded over flat upon itself a little beyond the end of the tablet or stick of gum 2 to form a pull tab or grip 8, and that corner of the upper portion of said inner wrapper section 5 which lies adjacent the shoulder 4 and notch 3 is then crimped through the notch 3 and folded back flat against one side of the lower inner wrapping section 5, as at 6, as illustrated in Figures 7 and 8.

The stick of gum or tablet 2 and lower inner sealing wrapper section 5 as thus associated are then arranged on the medial longitudinal portions of the upper inner sealing wrapper section 9 and the individual outer wrapper 13, which have their opposed faces of the longitudinal medial portions secured together, preferably as at 10 over an extensive area by any suitable means such as a suitable adhesive, as indicated by dotted lines in Figure 9. Thereafter the side $d$ of section 9, which may be transversely cut from its marginal edge and as indicated at 12, is folded down flat against the upper face of side $b$ of section 5 with said cut 12 substantially in registry with the upper end of said side $b$, the triangular corner pieces or ears 7 and 11 of said sides $b$ and $d$ respectively are next folded back together substantially at the points indicated by dotted lines in Fig. 9, so that corner or ear 7 lies outside of the corner or ear 11 so as to, with side $a$ of section 5, form a hook engaging the slanting edge of section 9, due to the folding over of ear or corner 11, and give a positive interlocking relation or engagement between said sections 5 and 9, as illustrated in Fig. 10. Thereafter the side $e$ of the upper inner sealing wrapper section 9 is folded over flat against said ear or corner 7 and side $d$, and the upper end $f$ of said upper inner sealing wrapper section 9, as thus longitudinally folded, is folded over flat against the side $e$, and the sides of the individual outer wrapper 13 are drawn tightly about the sections 5 and 9 and folded across the same, in which position they extend across the adjacent inner ends of the respective end folds $c$ and $f$, overlap each other along their marginal longitudinal edges, and have the opposed faces of their overlapping marginal edge portions secured together by any usual and suitable adhesive, thus operatively constituting an endless band extending in tight contact at all points about said inner wrapper sections excepting the respective extreme outer end portions thereof.

The medial portion of the upper end portion of the individual outer wrapper 13 will preferably be formed with a preferably integral extension or hold tab 14.

Of course it will be readily understood that the fold $d$ may be simply notched out instead of having its corner 11 folded back, and that this notch may be triangular, corresponding in size and shape to the area between the cut 12 and the dotted line indicating the point of fold of ear or corner 11, or of different form of triangle, or may be quadrilateral, or may be of outwardly flaring form, the lower edge of such notch slanting outwardly downwardly at any angle of slant or inclination desired, the hooking ear or tongue 7 being correspondingly formed, or formed, so as to fold over the lower edge of the cut or notch in fold 5 along a line in general corresponding, or preferably corresponding, to the lower edge or wall of said notch, and of course if this line be at right angles to the longitudinal central line of the two sections 5 and 9, or flaring outwardly and downwardly, the interlock between the two sections would be more positive than if the line slanted inwardly and downwardly approximately at 45 degrees as illustrated. However, it is found in actual practice that the construction illustrated results in a very efficient interlock sufficient for all purposes in view, permitting the sections 5 and 9 to be separated without too much effort or difficulty, while effectually preventing unintentional separation.

When the parts have been assembled as above, the individual outer wrapper 13 serves to hold the ends $c$ and $f$ tightly closed, the overlapping portions of sections 5 and 9 in contact tightly with each other, and to hold the folded interlocking ears or corners 7 and 11 and the crimped and folded portion 6 tightly flat in folded condition to maintain the interlocking relation of said sections 5 and 9 and the independent interlocking relation of said lower inner sealing wrapper section 5 and the tablet or stick of gum 2.

It is contemplated that a person buying a commercial package of a plurality of individual units such as illustrated in Fig. 1 will tear off the common outer wrapper 1 and put the loose units in his pocket. Thereafter, if he desires a chew of gum while driving, he will keep one hand on the wheel to control the vehicle and with the other hand will remove an individual unit, such as above described, from his pocket, grasp the hold tab 14 between his lips or teeth, and grasp the pull tab or portion 8 between his thumb and forefinger, as illustrated in Fig. 2, thereafter pulling on pull tab or portion 8 sufficiently to cause the ear or corner 7 to straighten out in the separation of sections 5 and 9 and permit the downward withdrawal of the section 5, with the tablet or stick of gum 2 held therein, from the upper inner sealing wrapper section 9 and the individual outer wrapper 13, as illustrated in Fig. 3, it being noted that thus far there has been no relative pull or tension between the lower inner sealing wrapper section 5 and the tablet or stick of gum 2 and, consequently no pull or tension exerted on their interlock or positive mechanical connection, which at this stage is unimpaired.

The lips or teeth are now separated to release the hold tab 14 to drop or discard the individual outer wrapper 13 and connected parts, the lower inner sealing wrapper section 5 with the partially exposed tablet or stick of gum 2 still being held by pull tab or portion 8 between the thumb and forefinger of the consumer's hand and with the exposed upper portion of said tablet or stick of gum 2 presented toward the consumer's mouth. After said outer individual wrapper 13 with section 9 and hold tab 14 have been discarded, as above mentioned, the consumer next grips the exposed upper end portion of the tablet or stick of gum 2 between his teeth or lips and pulls downward on pull tab or portion 8, as illustrated in Fig. 4, so completing the stripping of the wrapping from the tablet or stick of gum 2, thereafter, of course, discarding the lower inner sealing wrapper section 5 and manipulating his lips, teeth and tongue to draw said tablet or gum 2 into his mouth. From the foregoing it will be noted that the tablet or gum 2 is introduced into the consumer's mouth without being touched by his hand, clothing or any foreign object, and that after once gripping the pull tab or portion 8 between his thumb and forefinger he maintains such grip throughout the stripping operation without need for changing or shifting his grip in any way.

All wrappings, hold tabs, pull tabs, in fact all parts, except the contained article and the adhesive, will preferably be of paper, though this is not essential, and will preferably be of such thickness, tensile strength, moisture-proof and atmosphere-resisting qualities and other characteristics as are best suited to their functions all as now in general well known and understood by those skilled in the art.

Of course the interlock between the tablet 2 and the lower inner sealing wrapper section 5, as constituted by the notch 3, shoulder 4 and crimp and fold 6 may be dispensed with, if desired, in the interests of simplicity and economy in the packaging operation, the interengagement between the two inner sealing wrapper sections 5 and 9 by means of the ears 7 and 11 or substitute parts having the same general functions being, however, retained, the frictional contact between the tablet or stick of gum 2 and the inner face of the lower inner sealing wrapper section 5 being, in such case, relied upon to maintain the tablet 2 in said lower section 5 during the withdrawal from the upper inner sealing wrapper section 9 and the individual tubular outer wrapper 13, it being noted that although the lower inner wrapper section 5, on being withdrawn from outer wrapper 13 and so released from the binding action thereof may slightly spread, so impairing the frictional contact between it and the tablet 2, but even so, there will most usually be some appreciable frictional contact between them, resisting their unintentional separation and, further, of course, the lower inner sealing wrapper section 5 will extend about and below the tablet or stick of gum 2, which will normally be inserted by an upward movement directly into the consumer's mouth, the said section 5 thus serving as a cup or bottom socket for said tablet or stick of gum 2, so that there would be no occasion to turn the gum so that it could, and hence there would be very little risk that it would, drop out of section 5 while partially stripped and before being gripped by the consumer between his teeth or lips.

However, the provision of the feature of such interlock between the tablet or stick of gum 2 and the section 5, even though not essential, is preferred.

Having thus described my invention, what I claim as new and desire to secure by Letters Patent is:

1. A package comprising a tablet of long, narrow, thin contour formed with a shoulder at a distance from one of its ends, in combination with a wrapping applied snugly about a portion of said tablet and having a portion extending across the face of said shoulder and resisting unintentional endwise separation of said tablet and said wrapping.

2. A package comprising a tablet of long, narrow, thin contour formed with a shoulder at a distance from one of its ends, in combination with a wrapping applied snugly about a portion of said tablet and having a portion crimped about said shoulder and folded toward the outer face of an adjacent portion of said wrapping, said wrapping extending from one end of the tablet for less than the length thereof.

3. A package comprising a tablet of long, narrow, thin contour formed with a shoulder at a distance from one of its ends, in combination with a wrapping applied snugly about a portion of said tablet and having a portion crimped about said shoulder and folded toward the outer face of an adjacent portion of said wrapping, and means for normally holding said crimped and folded portion of said wrapping against substantial movement in a direction away from said outer face of said adjacent portion of said wrapping.

4. A sanitary package comprising a tablet of long, narrow, thin contour formed with a shoulder at a distance from one of its ends, in combination with a wrapping applied snugly about a portion of said tablet and having a portion crimped about said shoulder and folded toward the outer face of an adjacent portion of said wrapping, and an individual open-end tubular outer wrapper operatively endless in cross-section and bearing against said crimped and folded portion to resist unfolding thereof so long as disposed within said outer wrapper.

5. A sanitary package comprising a tablet of long, narrow, thin contour formed with a notch in one side edge portion, in combination with a wrapping applied snugly about a portion of said tablet and about the lower end thereof and extending in unbroken area from said lower end to said notch and having a portion folded through said notch and substantially flat against the adjacent portion of the outer face of said wrapping to positively mechanically interlock with said tablet, and tubular means endless in cross-section fitting snugly about said wrapping and normally holding said folded portion substantially flat to preserve and maintain said interlocking relation between said tablet and wrapping.

6. A sanitary package comprising a tablet of long, narrow, thin contour formed with a notch in one side edge portion, and a lower inner sealing paper wrapper section snugly applied about the lower end and lower portion of said tablet and having a portion folded through said notch and substantially flat against the adjacent portion of the outer face of said wrapper section to positively mechanically interlock with said tablet, in combination with an upper inner sealing paper wrapper section snugly applied about the upper end and upper portion of said tablet, said inner sealing wrapper sections overlapping to together completely cover and seal in said tablet at all points, and said sections having positive mechanically interengaging portions resisting their endwise separation away from each other, and an individual outer tubular open ended wrapper relatively tightly embracing said inner sealing wrapper sections and holding said folded portion of said lower section against substantial movement away from said tablet and resisting the disengagement of said interengaging portions, said individual outer wrapper and said upper inner sealing wrapper section being connected together against relative endwise movement.

7. A sanitary package comprising a tablet of long, narrow, thin contour, and a lower inner sealing paper wrapper section snugly applied about the lower end and lower portion of said tablet, in combination with an upper inner sealing paper wrapper section applied about the upper end and upper portion of said tablet, said inner wrapper sections overlapping to together completely cover and seal in at all points said tablet, and one of said sections having a projection engaging a cooperating portion of the other of said sections interposed in the path of movement of said projection in an endwise direction away from said latter section to prevent their unintentional endwise separation, and a common means embracing said inner wrapper sections to normally maintain them in operative sealing condition and to resist the deformation of said projection.

8. A sanitary package comprising a tablet of long, narrow, thin contour, and a lower inner sealing wrapper section snugly applied about the lower end and lower portion of said tablet, in combination with an upper inner sealing wrapper section applied about the upper end and upper portion of said tablet, said inner wrapper sections overlapping each other to together completely cover and seal in said tablet at all points, and one of said sections having a projection engaging a portion of the other of said sections interposed in the path of movement of said projection in an endwise direction away from said latter section, and an individual outer wrapper operatively constituting an open-end endless band extending in contact at substantially all points about said inner sealing wrapper sections and resisting the deformation of said projection.

9. A sanitary package comprising a tablet of long, narrow, thin contour, and a lower inner sealing wrapper section snugly applied about the lower end and lower portion of said tablet, in combination with an upper inner sealing wrapper section applied about the upper end and upper portion of said tablet, said inner sealing wrapper sections overlapping each other to together completely cover and seal in said tablet at all points, and one of said sections having a projection engaging a portion of the other of said sections interposed in the path of movement of said projection in an endwise direction away from said latter section to prevent their unintentional endwise separation, an individual outer wrapper operatively constituting an open-end endless band extending in contact at substantially all points about said inner sealing wrapper sections and resisting the deformation of said projection, and means permanently and relatively immovably securing together said outer wrapper and said upper inner sealing wrapper section.

In testimony whereof, I have signed my name to this specification at Pasadena, California, this 22nd day of August, 1929.

WILLIS JOSEPH RITZEL.